United States Patent [19]
Melen

[11] Patent Number: 5,519,787
[45] Date of Patent: May 21, 1996

[54] METHOD OF COMPRESSING IMAGE DATA HAVING A UNIFORM BACKGROUND TINT

[75] Inventor: Roger D. Melen, Los Altos Hills, Calif.

[73] Assignee: Canon Kabushiki Kaisha, Tokyo, Japan

[21] Appl. No.: 279,560

[22] Filed: Jul. 25, 1994

[51] Int. Cl.$^6$ .............. G06K 9/38; G06K 9/36; H04N 1/40; H04N 1/41

[52] U.S. Cl. .............. 382/169; 382/232; 358/455; 358/429

[58] Field of Search ................. 382/50, 51, 54, 382/169, 237, 270, 273, 274; 358/456, 429, 459, 455, 456, 461

[56] References Cited

U.S. PATENT DOCUMENTS

| | | | |
|---|---|---|---|
| 4,695,884 | 9/1987 | Anastassiou et al. | 382/51 |
| 4,853,970 | 8/1989 | Ott et al. | 382/199 |
| 5,111,302 | 5/1992 | Chan et al. | 358/459 |
| 5,212,741 | 5/1993 | Barski et al. | 382/51 |
| 5,309,254 | 5/1994 | Kuwabara et al. | 382/50 |
| 5,351,306 | 9/1994 | Finkler et al. | 382/50 |

*Primary Examiner*—Leo Boudreau
*Assistant Examiner*—Matthew C. Bella

*Attorney, Agent, or Firm*—Paul Hentzel

[57] ABSTRACT

The method of compressing image data having a background tint is carried out by general apparatus 10. Greyscale image data containing stroke based symbols is retrieved to form a pixel data stream 10S of digital image data. The stream has stroke foreground pixels and non-stroke background pixels. The greyscale image data has levels of greyscale extending along an intensity scale from a minimum low intensity level 34L to a maximum high intensity level 34H. The stroke foreground pixels of the digital image data are predominantly pixels at the maximum greyscale level, and the non-stroke background pixels are predominantly pixels at the minimum greyscale level. A clamping range 34R of low intensity greyscale levels is determined extending continuously from the minimum greyscale level up to a greyscale level at least as great as the predominant level forming the non-stroke background pixels. A low intensity greyscale clamping level greater than the minimum greyscale level is determined. The greyscale levels of the retrieved image data that are within the clamping range are clamped to the low intensity clamping level to provide a uniform shade of low intensity background tint. The clamped digital image data is compressed to reduce the data storage requirements therefor, and entered into data storage device 10M.

22 Claims, 3 Drawing Sheets

GENERAL METHOD

GENERAL METHOD

METHOD OF COMPRESSING IMAGE DATA HAVING A UNIFORM BACKGROUND TINT

TECHNICAL FIELD

This invention relates to compression of image data, and more particularly to such image data having a uniform background tint.

BACKGROUND

Heretofore original documents carrying continuous intensity greyscale images were scanned into memory and digitized into a pixel matrix of discrete greyscale levels. Low contrast background noise on the original documents such as smudges of foreign substances, fiber grain, watermarks, off-color paper etc., became pixels of low intensity greyscale levels. Data compression of these digital images was impaired by the numerous low magnitude transitions in greyscale level within the background region which typically accounts for over 90% of the total document area. Later when the memory image was returned to hard copy by a printer, these low intensity greyscale pixels were faithfully reproduced on the hard copy. This background noise was randomly distributed in the non-stroke region, around and between the strokes (foreground signal) forming the symbols (text) of the image. The background noise distracted the reader and diverted the reader's full attention from the printed symbols. Reading the text contained in the original document and the reproduced hard copy was wearisome to the reader.

Ser. No. 08/112,133, filed Aug. 26, 1993 now abandoned to Roger D. Melen and Hadar Avi-Itzhak, and assigned to the present assignee, teaches the classification of an unknown input symbol with a library of known templates. The background pixels of the input symbol is clamped to zero to match the corresponding background pixels of the templates. The resulting higher match between the symbol and the template produces a higher correlation coefficient.

SUMMARY

It is therefore an object of this invention to provide an improved method of image data compression.

It is another object of this invention to provide such improved data compression of image data having a minimum of background transitions.

It is another object of this invention to provide such improved data compression of image data having a uniform background tint.

It is another object of this invention to provide such improved data compression in which the uniform background tint cosmetically enhances the strokes forming the symbols of the image.

It is another object of this invention to provide such improved compression in which the uniform background tint produces image text which is easier to read.

Briefly, these and other objects of the present invention are accomplished by providing a method of compressing image data having a background tint. Image data containing stroke based symbols is retrieved from a data source to form a pixel data stream of digital image data having stroke foreground pixels and non-stroke background pixels. The image data has levels of greyscale extending along an intensity scale from a minimum low intensity greyscale level to a maximum high intensity greyscale level. The stroke foreground pixels of the digital image data are predominantly pixels at or near the maximum greyscale level, and the non-stroke background pixels are predominantly pixels at or near the minimum greyscale level. A clamping range of low intensity greyscale levels is determined. The clamping range extends continuously from the minimum greyscale level up to a greyscale level at least as great as the greyscale predominant level forming the non-stroke background pixels. A low intensity greyscale clamping level is determined which is greater than the minimum greyscale level. The greyscale levels of the retrieved image data that are within the clamping range are clamped to the low intensity clamping level. The clamping changes the greyscale levels of the non-stroke background pixels to the low intensity clamping level which provides a uniform shade of low intensity background tint for the stroke based symbols in the digital image data. The clamped digital image data then is compressed to reduce the data storage requirements therefor, and entered into data storage device.

BRIEF DESCRIPTION OF THE DRAWING

Further objects and advantages of the present data compression method and the cosmetic effect of the uniform background tint will become apparent from the following detailed description and drawing (not drawn to scale) in which.

Figure 1:
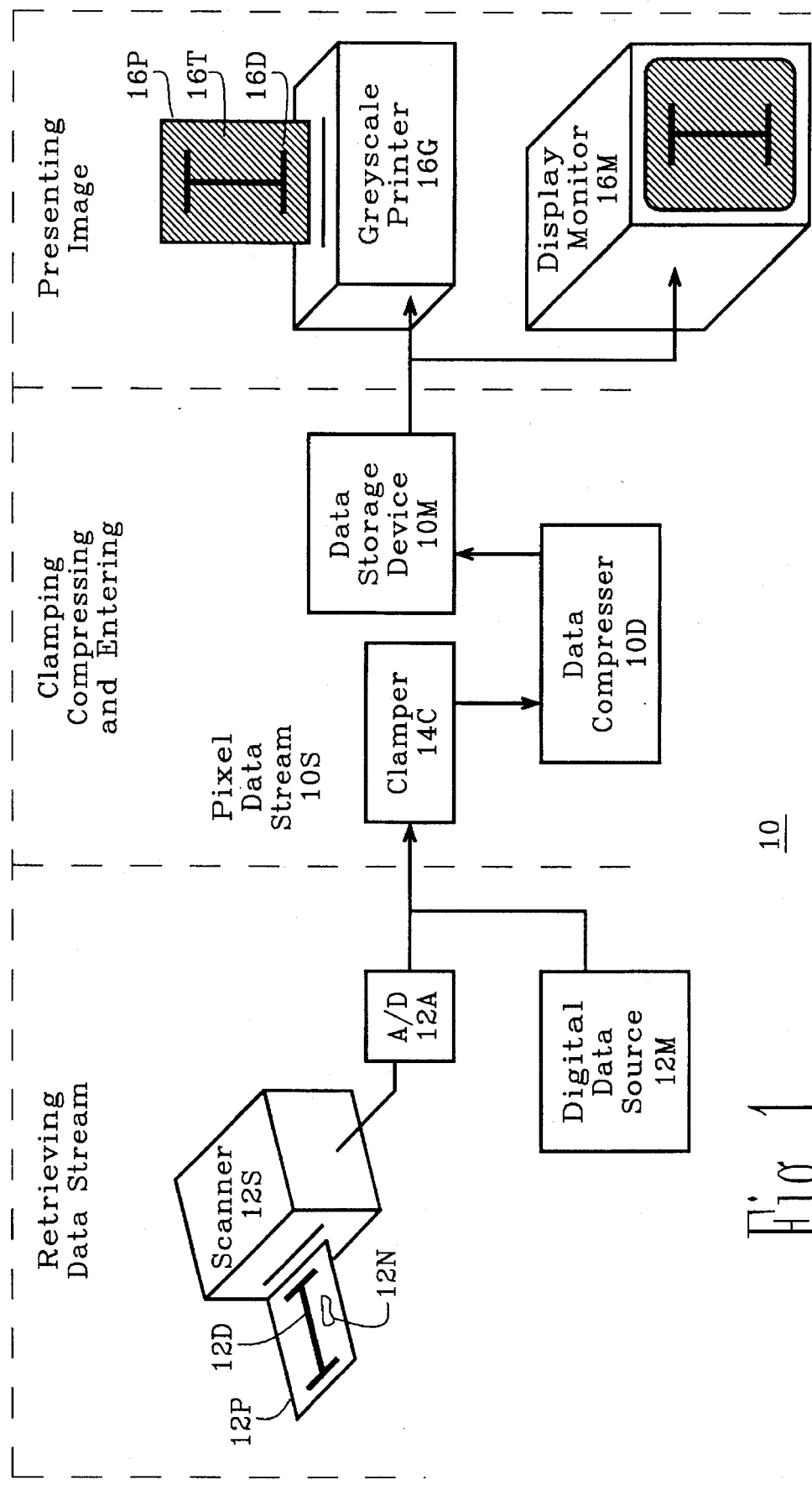
FIG. 1 is a functional block diagram of apparatus for carrying out the present method showing data compression and uniform background tint.

The elements of the invention are designated by two digit reference numerals in the above figures. The first digit indicates the figure in which that element is first disclosed or is primarily described. The second digit indicates like features and structures throughout the figures. Some reference numerals are followed by a letter which indicates a subportion or related feature of that element.

Figure 2:
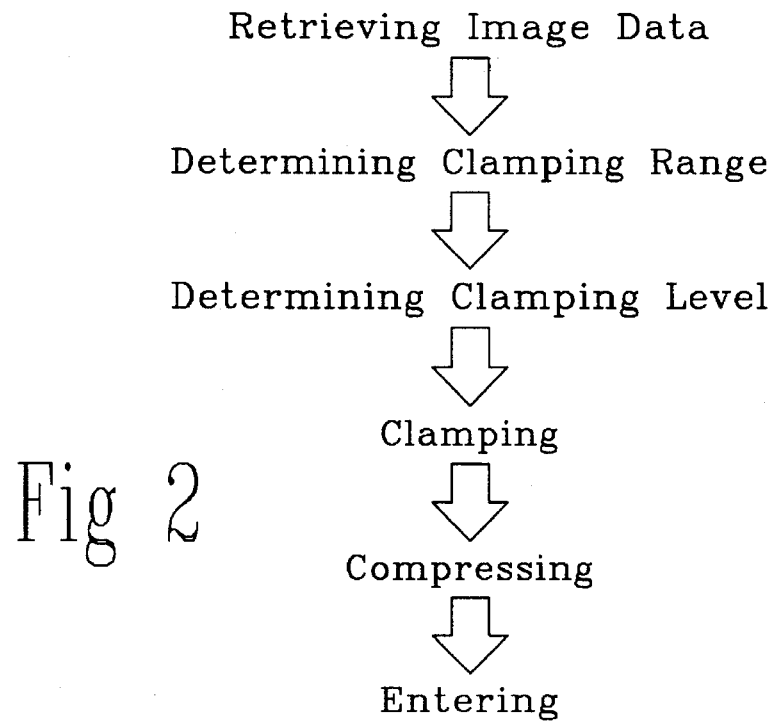
FIG. 2 is a flow chart showing the basic steps of the present method.
Figure 3:
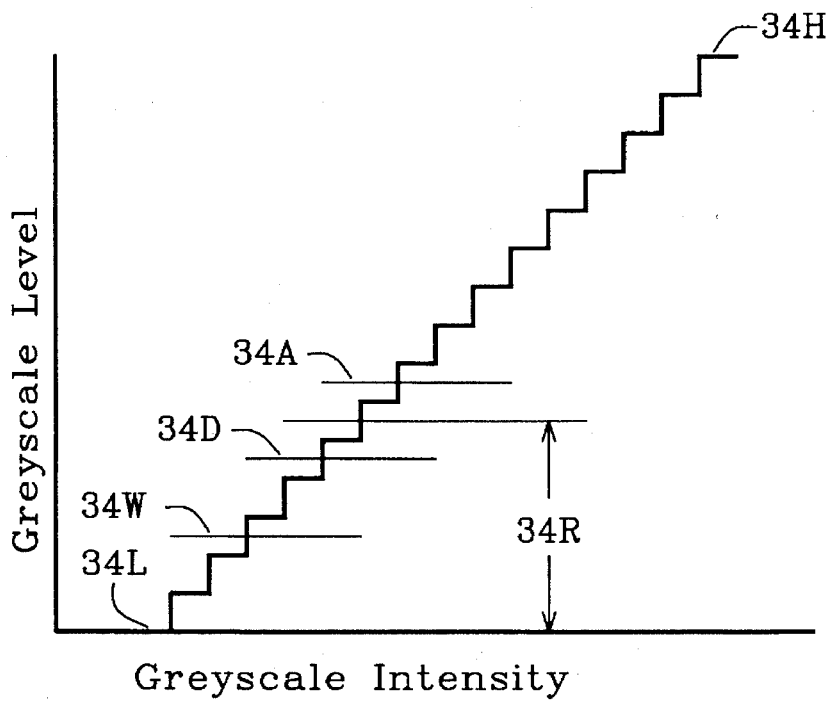
FIG. 3 is a plot of greyscale intensity verses greyscale levels showing the clamping range and clamping level which establish the background tint.

GENERAL APPARATUS AND METHOD (FIGS. 1, 2 and 3)

General apparatus 10 for carrying out the method of compressing image data having a background tint is shown in FIG. 1. The basic steps of the general method are shown in the flow chart of FIG. 2, and summarized below.

Retrieving greyscale image data containing stroke based symbols from a data source (see Data Retrieval Section) to form a pixel data stream 10S of digital image data. The data stream has stroke foreground pixels which form the symbol and non-stroke background pixels which form the space around and between the stroke pixels. In a typical text image the foreground pixels are vastly outnumbered by the background pixels. The greyscale image data has levels of greyscale extending along an intensity scale from a minimum low intensity level 34L to a maximum high intensity level 34H (see FIG. 3). The stroke foreground pixels of the digital image data are predominantly pixels at or near the maximum greyscale level. That is, the stroke pixels forming the body of the stroke tend to be high intensity having an average intensity value near the maximum greyscale level with occasional outliers. Similarly, the non-stroke background pixels are predominantly pixels at or near the minimum greyscale level. A few of the stroke pixels are transition pixels along the edge of the stroke, and border on the non-stroke region. These edge transition pixels form a sliver of pixels with body stroke pixels on one side and non-stroke pixels on the other, and may have greyscale values any where between the maximum and minimum greyscale levels.

Determining a clamping range 34R of low intensity greyscale levels extending continuously from the minimum greyscale level up to a greyscale level at least as great as the predominant level forming the non-stroke background pixels.

Determining a low intensity greyscale clamping level greater than the minimum greyscale level (see Clamping Section).

Clamping the greyscale levels of the retrieved image data that are within the clamping range to the low intensity clamping level, using a suitable mapping device such as clamper 14C. During operation of the clamper, each pixel of the image is compared to the clamping range. All pixels inside the clamping range are mapped to a constant (the clamping level), and all pixels outside the clamping range are mapped 1:1 and remain unchanged. The clamping changes the greyscale levels of the non-stroke background pixels within the clamping range to the clamping level, and provides a uniform shade of low intensity background tint for the stroke based symbols. The shade of the background tint is established by the value of the determined clamping level, and in text applications is typically of a much lower intensity than the foreground strokes.

Compressing the clamped digital image data to reduce the data storage requirements therefor, using a suitable filter device such a data compressor 10D. The compression may be run-length compression which is "lossless", or JPEG compression which is "lossey". A typical page of image text of about 15 megabits maybe compressed to about 1.5 megabits using JPEG compression. Clamping the image may reduce the data storage requirement another 50%, to about 0.75 megabits.

Entering the compressed clamped digital image data into a suitable memory device such as data storage device 10M such as a hard disk or central network memory.

DATA RETRIEVAL (FIG. 1)

The retrieved image data may be analog image data having continuous greyscale values along the intensity scale. These continuous greyscale values are converted into a predetermined number of discrete greyscale levels during retrieval by a suitable analog to digital converter such as A/D 12A to provide the pixel data stream of digital image data. During the retrieving step prior to the A/D conversion, image data 12D (shown as an uppercase letter "I") may be scanned from a recording medium such as paper 12P to provide the analog image data. The scanning may be effected by any suitable detecting apparatus such as scanner 12S employing an optical diode array.

Alternatively, the retrieved image data may already be digital image data having a predetermined number of greyscale levels along the intensity scale. During the retrieving step the digital image data may be addressed from a suitable data memory device such as digital data source 12M to provide the pixel data stream of digital data.

CLAMPING (FIG. 3)

The determined low intensity clamping level may be any level 34W within clamping range 34R of low intensity greyscale levels. The position of the clamping level within the clamping range determines the shade of the uniform background tint. Clamping level 34D is farthest from the minimum greyscale level and provides the most intense (darkest) background tint. Clamping level 34A is above (outside but proximate to) the clamping range of low intensity greyscale levels. The background shade established by clamping level 34A is darker than some of the lower intensity foreground pixels, and creates a highlight or halo around the symbols. The determined clamping level for establishing the uniform shade of background tint may be one greyscale level selected from among a plurality of clamping levels. This selection provides one shade of background tint from a plurality of shades of background tints to suit diverse applications and conditions. Alternatively, the determined clamping level may be a single clamping level for providing a single shade of background tint optimized for a specific application such as cosmetic enhancement (see Cosmetic Enhancement Section).

Most of the pixels in the image data are background pixels and do not contain and any stroke information. Some of these background pixels may contain paper noise, such as smudge 12N shown on scanned paper 12P. Therefore clamping these pixels to background tint level does not represent any lose of data. In fact the signal-to-noise ratio of the image data may increase because smudges (and other paper noise) become buried in background tint 16T of paper 16P from printer 16G. A wide clamping range incorporates more paper noise into the background tint to present a "cleaner" background. However, a wide clamping range may also incorporate some of the edge transition pixels with lower greyscale levels, thus wiping out some of the stroke data or signal.

PRESENTING (FIG. 1)

The clamped digital image data with the uniform shade of background tint may be visually presented for providing a cosmetically enhanced visual image to the viewer (see Cosmetic Enhancement Section). The clamped digital image data may be presented by toning onto a suitable recording medium such as paper 16P using a suitable toning device such as greyscale printer 16G. The printer may provide the variable toned greyscale image by "half-toning" or incremental toning the paper with toner particles. Ink jet and laser printers may be employed. The stroke foreground pixel sites are toned at a high toning intensity to form toned image data 16D on the recording medium. The clamped background pixels are toned at a low toning intensity to form the uniform shade of low intensity background tint 16T.

Alternatively, the image data may be visually presented to the viewer as a raster of pixel scanlines on display monitor 16M. The stroke foreground pixels are displayed at a high illumination intensity to form illuminated symbols on the display monitor. The clamped background pixels are displayed at a low illumination intensity to form the uniform shade of low intensity background tint.

TONING (FIGS. 4A 4B 4C 4D 4E 4F 4G)

Figure 4D:
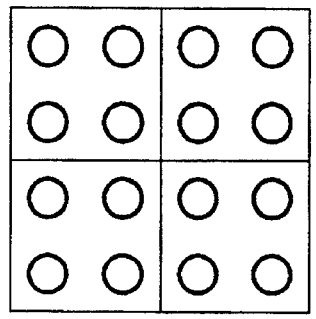
FIGS. 4B, 4C, 4D, 4E, 4F and 4G show various toning patterns for the background pixel sites.
Figure 4G:
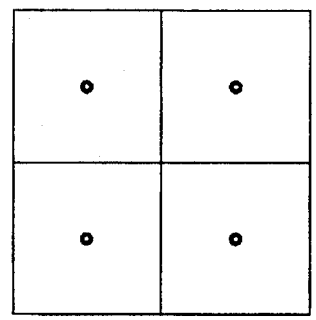
Figure 4C:
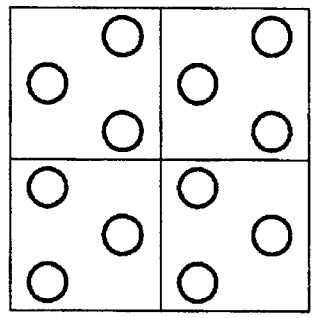
Figure 4F:
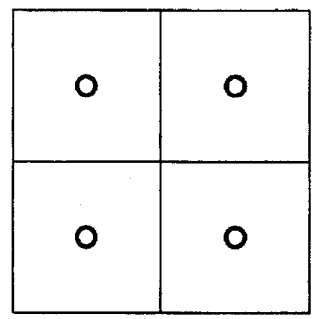
Figure 4B:
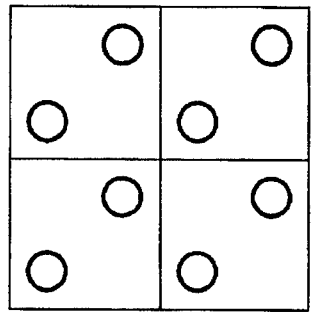
Figure 4E:
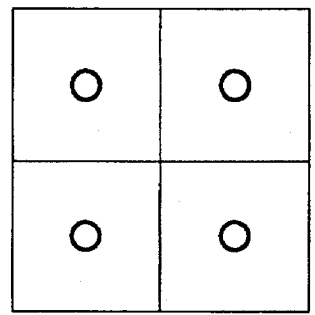
Figure 4A:
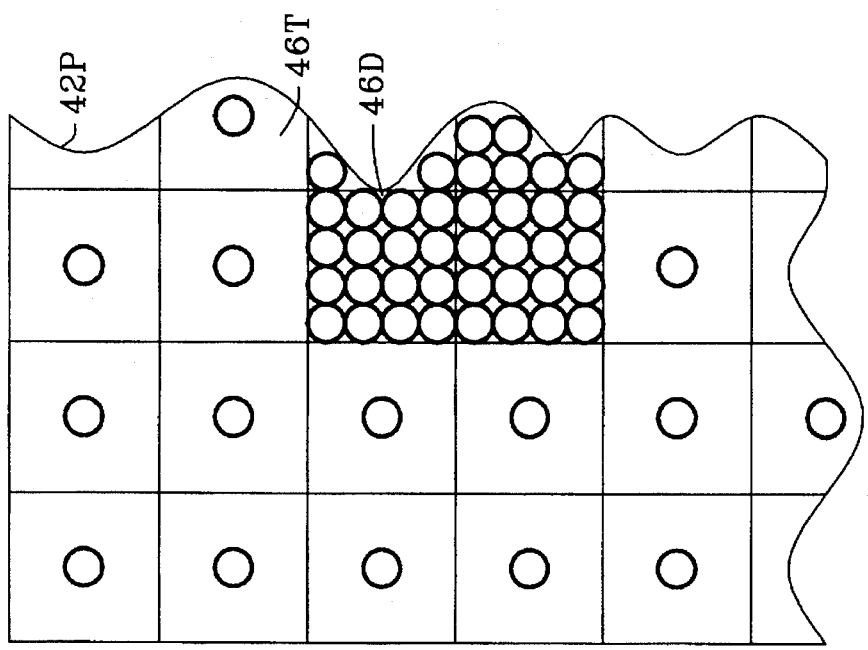
FIG. 4A is a fragmentary view of a pixel matrix with foreground pixel sites and background pixel sites.

The greyscale printer may deposit the toner forming the image along a two dimensional matrix of toned pixel sites on a recording medium as illustrated in FIG. 4A. The particular shade of the low intensity background tint may be achieved by depositing a predetermined number of units of toner arranged in a predetermined pattern within each non-stroke background pixel site, each toner unit having a predetermined amount of toner. The matrix embodiment of FIG. 4A a shows paper 42P with one small dot shaped toner unit (shown as an unshaded circle) within each non-stroke background pixel site 46T to establish the lightest background shade (minimum toner density). Darker background shades are established by depositing more toner dots (shown as unshaded circles) in each pixel site. The stroke pixel sites 46D have the maximum number of toner units packed close together to yield the darkest image (maximum toner density).

The number of greyscale levels available is determined by the printer dot resolution relative to the size of the pixel sites, the dot-to-pixel ratio. In the embodiment of FIG. 4A, a maximum of sixteen toner dots are be deposited within the pixel sites in a 4×4 pattern to establish sixteen possible shades of greyscale. More shades of greyscale are available at higher printer resolutions and larger pixel sites. For instance a dot-to-pixel ratio 64 in an 8×8 pattern provides 64 shades. A printer producing 1 mil dots (1,000 dpi) deposited into a 5 mil by 5 mil pixel yields 25 shades of grey.

Each toner unit may be positioned equidistant from adjacent toner units within the background pixel site containing the toner unit and also positioned equidistant from adjacent toner units within neighboring background pixel sites of the matrix. The matrix embodiment of FIG. 4D shows four neighboring pixel sites each with four small equidistant dots of toner. Each background pixel site has the same toner density and therefor the same background shade. This repeated equidistant pattern maximizes the uniformity of toner distribution for minimizing visible striations in the toner pattern.

The predetermined pattern for establishing the uniform shade of background tint may be one pattern selected from among a plurality of patterns for providing one shade of background tint from a plurality of shades of background tints. The matrix embodiments of FIGS. 4A, 4B, 4C and 4D show small dot background patterns of one dot, two dots, three dots and four dots respectively for providing progressively darker background tints. As the number of dots in the pattern increases, the spacing between adjacent dots decreases resulting in a higher toner density across the background region. The three dot pattern of FIG. 4C shows alternate columns of reversed patterns to enhance the equidistant feature of the background toner units.

The predetermined amount of toner for establishing the uniform shade of background tint may be one amount of toner selected from among a plurality of amounts of toner for providing one shade of background tint from a plurality of shades of background tints. The matrix embodiments of FIGS. 4E, 4F, and 4G show a single dot background pattern of progressively smaller dots for providing progressively lighter background tints. As the diameter of the dots in the pattern decreases, the toner density also decreases. Changing the diameter of the toner unit increases the number of background shades available to (the dot-to-pixel ratio) times (the number of sizes).

COSMETIC ENHANCEMENT

The symbols of the retrieved image data are from an underlying stroke based system of symbols which provides meaning to each individual symbol and/or group of symbols. The foreground stroke pixels form stroke features defined by the stroke based system. These stroke features are cosmetically enhanced for viewer recognition by the presence of the uniform background tint. The stroke foreground pixels forming each stroke feature and the adjacent the non-stroke background pixels surrounding each stroke feature form an edge interface therebetween. These interfaces deviate from the edge interface of the corresponding stroke feature from the underlying system of stroke based symbols due to font variations, printing imperfections, and noise (see Background Noise Section). The edge interface deviations are much smaller than the stroke features defined by the stroke based system. Perception of the edge deviations by the viewer interferes with the viewer's recognition of the underlying stroke features in the text image. This interference impedes the viewers determination of the meaning of symbols formed by the stroke features within the system of stroke based symbols. The background tint suppresses the viewer perception of the deviations, and enhances symbol recognition. In addition the background tint permits the use of off-color recycled paper.

BACKGROUND NOISE

A primary source of paper background noise is pulp grain, water marks, and other irregularities incorporated into the background region of the paper. Surface background noise is caused by foreign matter (smudges, stains, lint etc.) deposited on the document within the background region. Background noise (and foreground noise) may be caused mechanical movement such as scanner vibration and uneven paper advance. Electronic noise is produced by thermal noise and electron dark current. The background noises generated by these and other effects are not related to the stroke based symbols, and do not form part of the signal. They are not reproducible by rescanning and reprocessing the text image. The reduction or elimination of these background noises will enhance the signal-to-noise of the presented text image.

INDUSTRIAL APPLICABILITY

It will be apparent to those skilled in the art that the objects of this invention have been achieved by providing an improved method of image data compression. The method has a higher compression ratio because of the elimination of many background transitions through clamping. The method provides a uniform background tint which cosmetically enhances the strokes forming the symbols of the image, and makes the image text which is easier to read.

CONCLUSION

Clearly various changes may be made in the structure and embodiments shown herein without departing from the concept of the invention. Further, features of the embodiments shown in the various figures may be employed with the embodiments of the other figures.

Therefore, the scope of the invention is to be determined by the terminology of the following claims and the legal equivalents thereof.

I claim as my invention:

1. A method of compressing image data having a background tint, comprising the steps of:

retrieving greyscale image data containing stroke based symbols from a data source to form a pixel data stream of digital image data having stroke foreground pixels and non-stroke background pixels, the greyscale image data having levels of greyscale extending along an intensity scale from a minimum low intensity greyscale level to a maximum high intensity greyscale level, the stroke foreground pixels of the digital image data are predominantly pixels at or near the maximum greyscale level and the non-stroke background pixels of the digital image data are predominantly pixels at or near the minimum greyscale level;

determining a clamping range of low intensity greyscale levels extending continuously from the minimum greyscale level up to a greyscale level at least as great as the greyscale predominant level forming the non-stroke background pixels;

determining a low intensity greyscale clamping level greater than the minimum greyscale level the clamping level having one greyscale value;

clamping the greyscale levels of the retrieved image data that are within the clamping range to the low intensity clamping level for changing the greyscale levels of the non-stroke background pixels within the clamping range to the low intensity clamping level which provides a uniform shade of low intensity background tint for the stroke based symbols in the digital image data, the background tint having one greyscale shade;

compressing the clamped digital image data to reduce the data storage requirements therefor; and entering the compressed clamped digital image data into data storage means.

2. The method of claim 1, wherein the retrieved image data is analog image data having continuous greyscale values along the intensity scale.

3. The method of claim 2, wherein during the retrieving step the continuous greyscale values of the analog image data are converted into a predetermined number of discrete greyscale levels by means of an analog to digital converter to provide the pixel data stream of digital image data.

4. The method of claim 3, wherein during the retrieving step prior to the A/D conversion, the image data is scanned from a recording medium to provide the analog image data.

5. The method of claim 1, wherein the retrieved image data is digital image data having a predetermined number of greyscale levels along the intensity scale.

6. The method of claim 5, wherein during the retrieving step the digital image data is addressed from a data memory means to provide the pixel data stream of digital data.

7. The method of claim 1, wherein the low intensity greyscale clamping level is inside the clamping range of low intensity greyscale levels.

8. The method of claim 7, wherein the low intensity clamping level is the greyscale level of the clamping range which is farthest from the minimum greyscale level.

9. The method of claim 1, wherein the determined greyscale clamping level for establishing the uniform shade of background tint is outside the clamping range of low intensity greyscale levels.

10. The method of claim 1, wherein the determined greyscale clamping level for establishing the uniform shade of background tint is outside of and proximate to the clamping range of low intensity greyscale levels.

11. The method of claim 1, wherein the determined greyscale clamping level for establishing the uniform shade of background tint is one greyscale level selected from among a plurality of clamping levels for providing one shade of background tint from a plurality of shades of background tints.

12. The method of claim 1, wherein the determined greyscale clamping level for establishing the uniform shade of background tint is a single clamping level for providing a single shade of background tint.

13. The method of claim 1, further comprising the additional step of:

visually presenting the clamped digital image data with the uniform shade of background tint for providing a cosmetically enhanced visual image to a viewer.

14. The method of claim 13, wherein the clamped digital image data is visually presented to the viewer as a raster of pixel scanlines on a display monitor, in which the stroke foreground pixels are displayed at a high illumination intensity to form illuminated symbols on the display monitor, and the clamped background pixels are displayed at a low illumination intensity to form the uniform shade of low intensity background tint.

15. The method of claim 13, wherein the clamped digital image data is visually presented to the viewer as a two dimensional matrix of toned pixel sites on a recording medium in which the stroke foreground pixel sites are toned at a high toning intensity to form toned symbols on the recording medium, and the clamped background pixels are toned at a low toning intensity to form the uniform shade of low intensity background tint.

16. The method of claim 15, wherein the toning of the low intensity background tint is achieved by depositing a predetermined number of units of toner arranged in a predetermined pattern within each non-stroke background pixel site, each toner unit having a predetermined amount of toner.

17. The method of claim 16, wherein each toner unit is positioned equidistant from the toner units adjacent thereto in accordance with the predetermined pattern.

18. The method of claim 17, wherein each toner unit is positioned equidistant from adjacent toner units within the pixel site containing the toner unit and also positioned equidistant from adjacent toner units within neighboring pixel sites.

19. The method of claim 15, wherein the predetermined pattern for establishing the uniform shade of background tint is one pattern selected from among a plurality of patterns for providing one shade of background tint from a plurality of shades of background tints.

20. The method of claim 15, wherein the predetermined amount of toner for establishing the uniform shade of background tint is one amount of toner selected from among a plurality of amounts of toner for providing one shade of background tint from a plurality of shades of background tints.

21. The method of claim 13, wherein the stroke based symbols are from an underlying stroke based system of symbols which provides meaning to the each individual symbol and/or groups of symbols, and the foreground stroke pixels of the image data form stroke features defined by the system of stroke based symbols, which stroke features are cosmetically enhanced for recognition by the viewer by the presence of the uniform background tint.

22. The method of claim 21, wherein the stroke foreground pixels forming each stroke feature and the adjacent the non-stroke background pixels surrounding each stroke feature form an edge interface therebetween which deviates from the edge interface of the corresponding stroke feature from the underlying system of stroke based symbols, the edge interface deviations are much smaller than the stroke features defined by the stroke based system, perception of the edge deviations by the viewer interferes with the viewer's recognition of the stroke features in the text image and on the meaning of symbols formed by the stroke features within the system of stroke based symbols, and the background tint suppresses the viewer's perception of the deviations to enhance symbol recognition.

* * * * *